United States Patent
Amand et al.

[11] Patent Number: 5,574,220
[45] Date of Patent: Nov. 12, 1996

[54] VIBRATING BEAM FORCE-FREQUENCY TRANSDUCER

[75] Inventors: Yvon Amand, L'Isle Adam; Jean-Pierre Peghaire, Argenteuil, both of France

[73] Assignee: Sagem SA, Paris, France

[21] Appl. No.: 512,906

[22] Filed: Aug. 9, 1995

[30] Foreign Application Priority Data

Aug. 10, 1994 [FR] France .................. 94 09908

[51] Int. Cl.$^6$ .............. G01L 1/10; G01L 1/26
[52] U.S. Cl. .............. 73/514.29; 73/862.59; 310/321; 310/338
[58] Field of Search ............ 73/514.29, 862.59, 73/778, DIG. 1; 310/315, 321, 338, 346, 366, 370

[56] References Cited

U.S. PATENT DOCUMENTS

| | | | |
|---|---|---|---|
| 4,658,174 | 4/1987 | Albert | 73/514.29 |
| 4,773,493 | 9/1988 | Goodier | 73/862.59 |
| 4,785,215 | 11/1988 | Blech | 73/862.59 |
| 4,856,350 | 8/1989 | Hanson | 73/862.59 |
| 4,914,963 | 4/1990 | Sabiron | 73/862.59 |
| 5,020,370 | 6/1991 | Deual et al. | 73/514.29 |
| 5,036,715 | 8/1991 | Hanson | 73/862.59 |
| 5,367,217 | 11/1994 | Norling | 73/862.59 |

FOREIGN PATENT DOCUMENTS 0030741  6/1981  European Pat. Off. .

Primary Examiner—Hezron E. Williams
Assistant Examiner—Helen C. Kwok
Attorney, Agent, or Firm—Larson and Taylor

[57] ABSTRACT

A vibrating beam force-frequency transducer has a flat elongate blade designed to be interposed between two elements for applying a longitudinal force to the blade. The middle portion of the blade constitutes two lateral beams which are separated by a gap and which are interconnected by terminal portions of the blade. The beams carry electrodes for setting the beams into vibration in the plane of the major faces of the blade and for measuring the frequency of vibration. The terminal portions have extensions parallel to the beams and directed towards the middle of the blade in the longitudinal direction. The extensions are arranged for connecting them to the elements in zones that are closer together than are the terminal portions.

6 Claims, 3 Drawing Sheets

FREQU.METER 44
OSCILL. 42
→ S

VIBRATING BEAM FORCE-FREQUENCY TRANSDUCER

BACKGROUND OF THE INVENTION

The invention relates to vibrating beam force-frequency transducers which can constitute force-measuring devices of very small mass and volume.

More precisely, the invention relates to transducers of the type comprising a flat elongate blade for interposition between two elements for applying a longitudinal force to the blade, a middle portion of said blade constituting two lateral beams which are separated by a gap and which are interconnected by terminal portions of the blade, and which carry means for setting the beams into vibration in major of the large faces of the blade and means for measuring the frequency of vibration.

Such a transducer makes it possible to measure a traction or compression force applied to the beams. A particularly important, although non-exclusive, application lies in non-servo-controlled pendulum accelerometers having a seismic mass connected to a base via a hinge enabling it to act as a pendulum in a sense direction orthogonal to the hinge. The elements for applying the longitudinal force are then constituted by the base and the seismic mass.

Numerous transducers of the above type are already known. In such transducers, the terminal portions are designed to be secured to the force-applying elements. An embodiment is to be found in documents U.S. Pat. No. 3,238,789 and FR-A-2 454 614 (U.S. Department of Energy). FIG. 1 of the present application, which is not to scale for reasons of clarity, shows the mechanical portion of such a transducer 10 mounted between a base 12 and a pendulum seismic mass 14 connected to the base by a hinge 16. The transducer is constituted by an elongate quartz blade whose terminal portions provide respective connections (that can be considered as being fixed-end connections) both to the base and to the pendulum seismic mass. In the middle portion of the blade, a slot 18 separates two lateral beams 24a and 24b. In general, the blade is made of a piezoelectric material, e.g. quartz, and the means for vibrating the beams in their plane are constituted by electrodes (not shown) connected to a power supply and measurement circuit.

Such known transducers suffer from various drawbacks, associated in particular with the fact that the two beams cannot be made absolutely identical to each other and consequently have slightly different intrinsic resonant frequencies. For miniature transducers made by photolithography, having a resonant frequency of about 35 kHz, the resonant frequency f0a of one of the beams may differ from the resonant frequency f0b of the other beam by several tens of Hz. Because of the coupling between the beams, they vibrate at a single frequency f0 intermediate between f0a and f0b. This frequency is slightly different from the resonant frequency of each of the beams, thereby significantly lowering the Q-factor of the beams.

Another effect of this asymmetry is that interfering forces prone to be applied orthogonally to the sensitive axis $\underline{x}$, and in particular in the direction $\underline{z}$ parallel to the plane of the blade, influence the beams differently.

If such an interfering force Fz is exerted along the axis $\underline{z}$ at the roots of the beams, then the force gives rise to traction in one of the beams and to compression in the other, and the smaller the distance between the beams the greater the forces. Under the effect of such interfering forces, the resonant frequency f0b increases under the effect of the traction while the resonant frequency f0a decreases under the effect of the compression. The force $F_2$, depending upon its direction, can thus either increase the initial unbalance or tend to cancel it. In the first case, the Q-factor decreases, while in the second case it increases and tends towards its maximum. In either case the frequency slips so that there is a direct error in the output. These phenomena are square-law phenomena: if the force doubles then the frequency slip quadruples.

The appearance of such interfering forces in the fixing zones is inevitable. In the configuration shown in FIG. 1, any asymmetry between the ends of the hinge 16 will give rise, for example, to asymmetry in stiffness. During variations in temperature, a varying moment appears in the terminal portions about the axis $\underline{y}$, thereby giving rise to interfering variation in the frequency f0 of the transducer.

Proposals have already been made to reduce these defects by balancing the beams by depositing gold and then vaporizing it in part with laser shots. That solution is not totally satisfactory. The load of gold on the beams reduces Q-factor. The volatilization of gold layers disturbs the underlying surface layers of quartz and also reduce Q-factor. Balancing the resonant frequencies at a given temperature does not eliminate drawbacks due to differences in the lengths of the beams.

SUMMARY OF THE INVENTION

An object of the present invention is to provide a force-frequency transducer of the above-defined kind in which transfer of interfering forces to the beams from the force-applying elements is reduced.

To this end, the invention provides a transducer characterized in that said terminal portions include extensions parallel to the beams and directed towards the middle of the blade in the longitudinal direction, the extensions being provided with means for connecting them to said elements fixing in zones that are closer together than are the terminal portions.

This disposition makes it possible to avoid disturbing the inevitable initial unbalance between the beams and to avoid variations in the overall resonant frequency caused in particular by the application of interfering forces along the $\underline{z}$ direction.

It may also be considered that the above amounts to interposing a flexible connection between the ends of the beams and the portions of the blade which are fixed to the force-applying elements.

In a first embodiment of the invention, the extension from each terminal portion is in the form of a fork with the set of two beams being bracketed by the fork, thus making it possible to separate the two beams by no more than a narrow slot, and thus guarantee close coupling between them. In another embodiment, the extensions from the two terminal portions are placed between the beams, thereby making it possible to reduce the overall length of the transducer.

The above characteristics and others will appear more clearly on reading the following description of particular embodiments, given as non-limiting examples. The description refers to the accompanying drawings.

DETAILED DESCRIPTION

Figure 1:
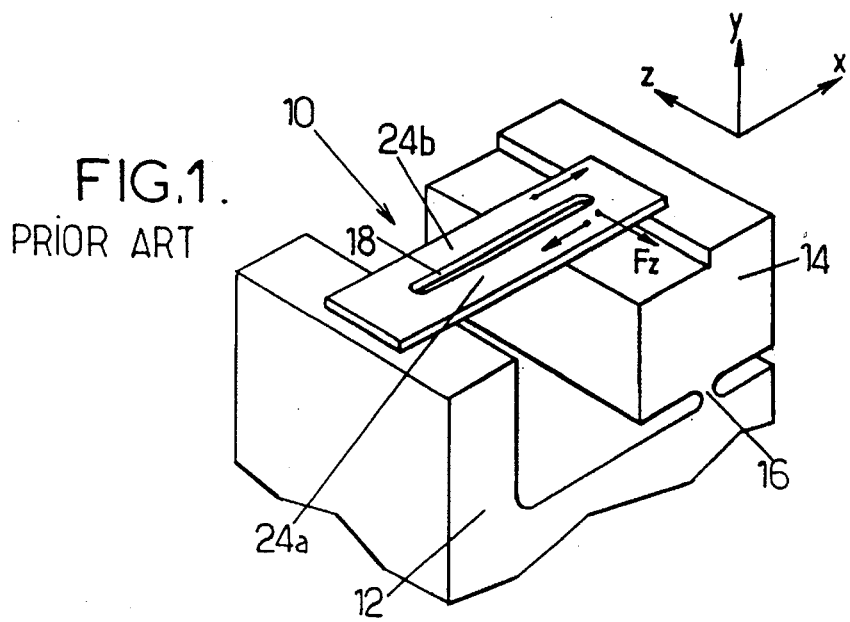
FIG. 1, already mentioned above, is a highly simplified perspective view showing how a known force-frequency transducer is mounted on an accelerometer.
Figure 2:
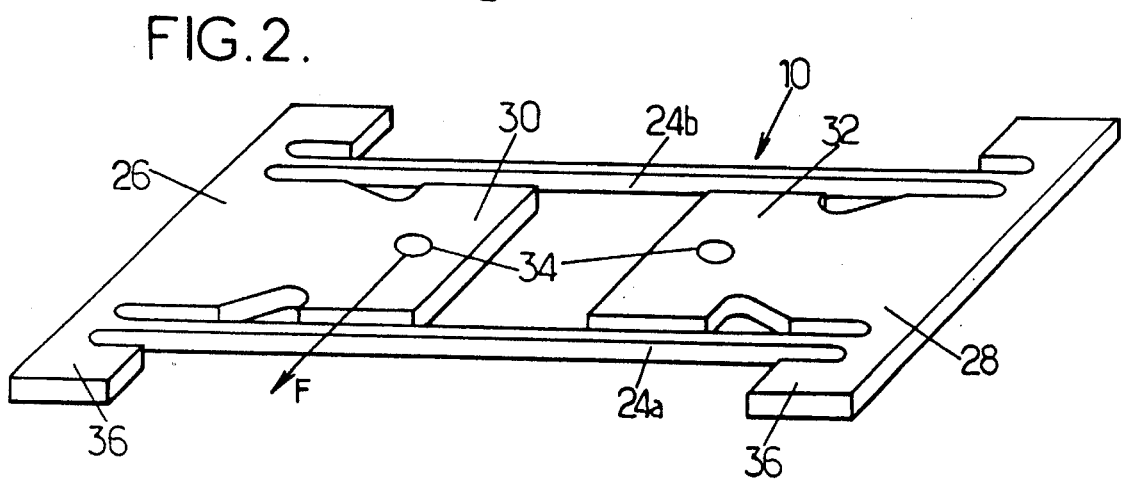
FIG. 2 is a perspective view of a transducer constituting a first embodiment of the invention, the electrodes being not shown and the drawing being not to scale in order to improve clarity.

The transducer shown diagrammatically in FIG. 2 is constituted by a resonator-constituting monolithic blade of piezoelectric material, typically quartz. The blade may be considered as having two terminal portions 26 and 28 that are interconnected by two parallel beams 24a and 24b that are separated by a gap. To make a miniature transducer, the blade used is thin, generally being about one-tenth of a millimeter thick.

The terminal portions 26 and 28 have extensions 30 and 32 extending towards the midplane of the blade, and situated between the beams in the example of FIG. 2.

The ends of the extensions are arranged to be secured to elements for applying compression and traction forces via connections that can be considered as fixed-end connections (i.e. connections which maintain a fixed direction of the end): the ends are flat and may be applied, for example, against corresponding faces of force-applying elements by means of pins that pass through holes 34 located in fixing zone, or they may be bonded in such fixing zones. Between these ends and the terminal portions, the extensions may have respective narrow zones to increase the transverse flexibility of the connection between the elements and the vibrating beams. Stubs 36 may be provided on either side of the terminal portions in order to ensure a degree of symmetry around the roots of the beams. The extensions 30 and 32 act as hinges and their flexibility tends to decouple the double tuning fork constituted by the beams and the terminal portions from external interfering stresses.

The blade may be cut out from a sheet of flat quartz, and the slots separating the beams from the extensions may be cut out by photolithography, using a technique that is well controlled and suitable for fabrication in batches. Photolithography makes it possible to form slots 18 that are very narrow, having a thickness of less than one-tenth of a millimeter.

Figure 3:
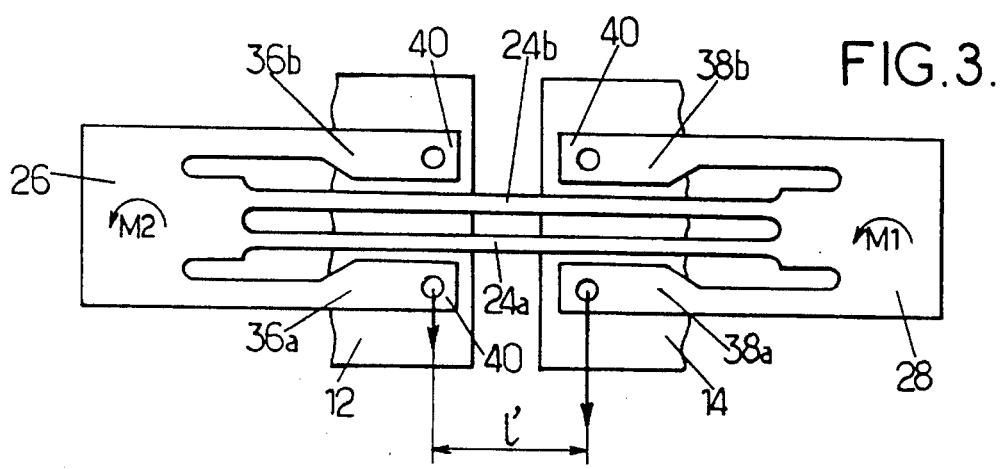
FIG. 3 is a diagrammatic plan view of a transducer constituting another embodiment of the invention, likewise made of piezoelectric material, and showing the effect of a particular interference force.

In the embodiment shown diagrammatically in FIG. 3, where elements corresponding to those of FIG. 2 are given the same reference numerals, the vibrating beams 24a and 24b are situated inside a frame formed by external extensions 36a, 36b, 38a, and 38b from the terminal portions 26 and 28. In this case also, the extensions or tabs are each provided with an end for fixing flat in fixing zones 40 separated by a distance 1' against elements that apply the force to be measured. The extensions or tabs may have respective narrower portions in the vicinity of their roots to increase flexibility and reduce the sensitivity of the double tuning fork to external interfering stresses.

Figure 4A:
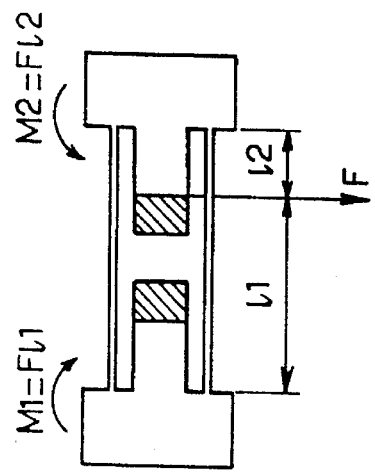
FIGS. 4a and 4b are theoretical diagrams for showing the parameters involved in a transducer of known type (FIG. 4a) and in a transducer constituting an embodiment of the invention (FIG. 4b)

FIG. 4a is a highly schematic representation of a transducer fixed according to the prior art. The beams are subjected by the frame to a torque M1 equal to F×L, giving rise to a tractive force in the upper beam and to a compression force in the lower beam.

Figure 4B:
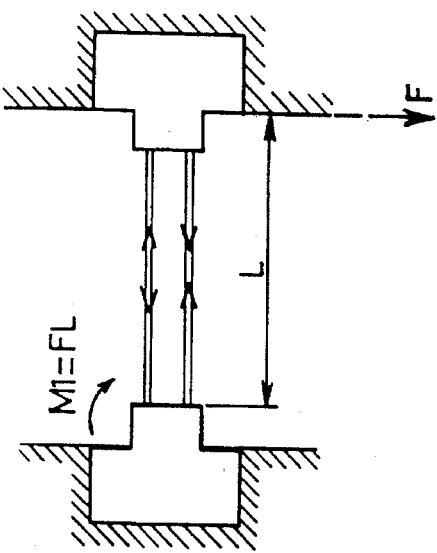

FIG. 4b shows in like manner a transducer implementing one of the principles of the invention, and as shown in greater detail in FIG. 2. In this case, two opposing torque moments are applied to the beams. These are $M2=F \times l2$ and $M1=F \times l1$. The resultant of these interfering stresses is thus reduced to the difference $M1-M2=F(l1-l2)$. The effect of interfering forces has thus been considerably reduced, particularly since the forces and moments give rise to frequency slips in application of a square-law. The improvement is thus very significant, and low levels of frequency slip are reached, even though the force F theoretically has no effect only when $l1=l2$.

A similar analysis shows that substantially the same result is obtained for a force F applied to the transducer of FIG. 3.

Both in the case of FIG. 2 and in that of FIG. 3, an additional advantage over the conventional mount consists in having the fixing zones close to each other: differences of thermal expansion between the material constituting the transducer, e.g. quartz, and the force-applying elements which are generally made of metal, operate over a shorter length. The effect of temperature variations is greatly reduced.

Figure 5:
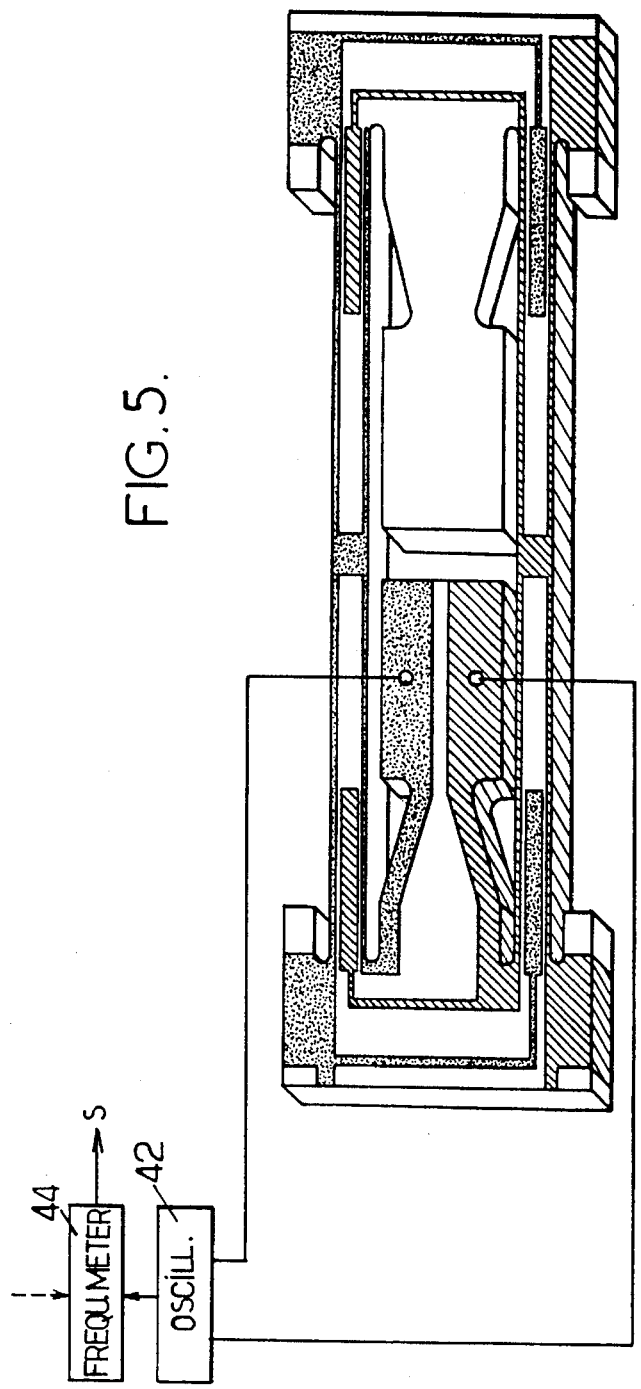
FIGS. 5 and 6 are respectively a view from above and a view from below of a transducer as shown diagrammatically in FIG. 2.
Figure 6:
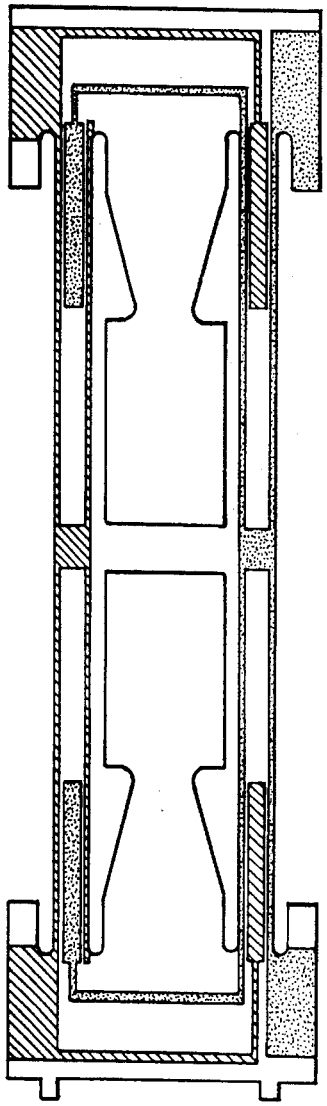

FIGS. 5 and 6 show one possible arrangement of electrodes for setting the beams into vibration in the plane of the blade. The electrodes are constituted by metal coated areas of organized as two groups in a disposition that, on the top face, is similar to that already described in U.S. Pat. No. 5,020,370 to which reference may be made. In the example shown in FIG. 6, the bottom electrodes reproduce the disposition of the top electrodes, with the necessary connections taking place round the edges of the blade. However, it would also be possible to providea grounded metal layer on the bottom face of the beams. All of the electrodes in the same group are connected to one of the two outlets of an oscillator 42 which is tuned to the resonant frequency of the beams, as measured by a frequency meter 44. It is possible to use a differential configuration having two transducers of the kind shown in FIGS. 5 and 6, with the frequency meter 44 then measuring the beats representing the difference between the frequencies of two identical transducers, one of which is subjected to the force to be measured while the other (whose output is represented by dashed line arrow in FIG. 5) is subjected to no force or to a force that is equal, but opposite.

For greater clarity, the electrodes belonging to the same group are shaded in FIGS. 5 and 6 differently from the electrodes belonging to the other set.

Figure 7:
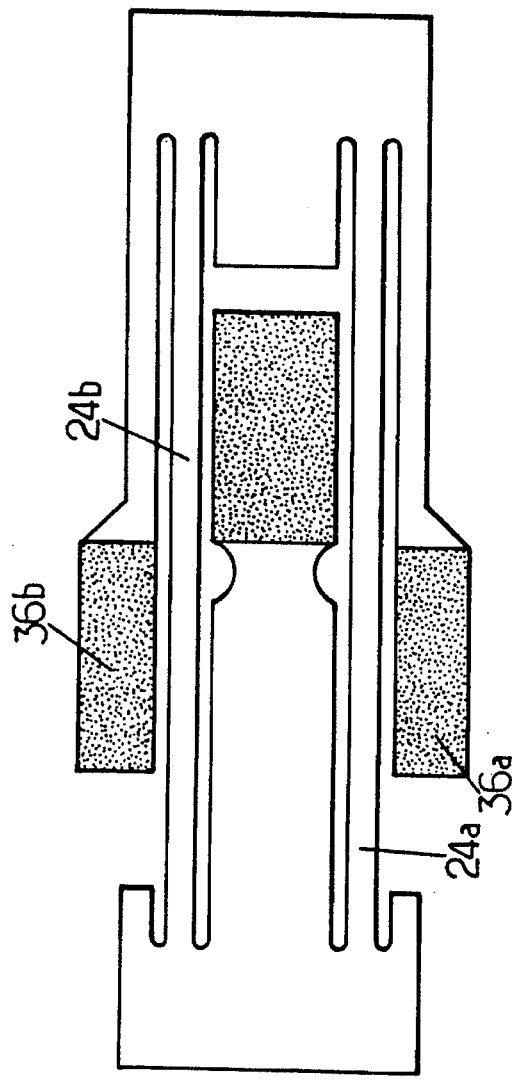
FIG. 7 is similar to FIG. 3 and is a schematic view of yet another embodiment.

In the embodiment shown in FIG. 7, where the fixing zones are illustrated by shaded areas, the terminal portion 26 has external extensions 36a and 36b extending towards the midplane and having ends arranged to be fixed to the force applying elements. The terminal portion 28 has a single central extension 32 likewise extending towards the midplane.

Numerous modified embodiments of the invention are possible. In particular, the blade may be made of a piezoelectric material other than quartz. It may be made of doped silicon and excited electrostatically or by means of a thin layer of piezoelectric material deposited on the blade. In addition to having lateral beams constituting a double tuning fork, the blade may have additional elements, giving it a structure that may be referred to as a three-beam structure, disclosed in GB-A-83 15 565.

We claim:

1. A vibrating beam force-frequency transducer comprising:

a flat elongate blade having two mutually parallel major faces, comprising a middle portion constituting two mutually parallel lateral beams separated by a gap and terminal portions interconnecting said lateral beams and extensions of said terminal portions parallel to the beams and directed toward a middle portion of the blade in a longitudinal direction thereof;

connecting means for connecting each one of said extensions to a respective one of a pair of force applying elements for applying a longitudinal force to said blade, said connecting means being so located that said force applying elements apply said longitudinal force to said blade in zones of said blade that are at a distance from each other smaller than a distance between said terminal portions;

means for setting said beams into vibration in a plane parallel to said major faces of said blade; and means for measuring a frequency of vibration of said beams.

2. A transducer according to claim 1, wherein each of said extensions is fork-shaped and straddles both said beams in said plane parallel to said major faces.

3. A transducer according to claim 1, wherein said extensions are straddled by said beams.

4. A transducer according to claim 1, wherein said extensions have a length substantially equal to a longitudinal distance between said zones.

5. A transducer according to claim 1, wherein one of the extensions is fork-shaped and the other of the extensions is straddled by said beams.

6. A transducer according to claim 1, wherein the blade is of a piezoelectric material and said means for setting said beams into vibration include electrodes fixed to said beams.

* * * * *